United States Patent
Xu et al.

(10) Patent No.: US 11,438,310 B2
(45) Date of Patent: Sep. 6, 2022

(54) IPX SIGNALING SECURITY

(71) Applicants: iBasis, Inc., Lexington, MA (US); Koninklijke KPN N.V., Rotterdam (NL)

(72) Inventors: Richard H. Xu, Wakefield, MA (US); Ewout Leonard Pronk, Zoetermeer (NL); Sander de Kievit, Tokyo (JP)

(73) Assignees: Koninklijke KPN N.V., Rotterdam (NL); iBasis, Inc., Lexington, MA (US)

( * ) Notice: Subject to any disclaimer, the term of this patent is extended or adjusted under 35 U.S.C. 154(b) by 170 days.

(21) Appl. No.: 16/963,778

(22) PCT Filed: Jan. 23, 2019

(86) PCT No.: PCT/EP2019/051571
§ 371 (c)(1),
(2) Date: Jul. 21, 2020

(87) PCT Pub. No.: WO2019/145330
PCT Pub. Date: Aug. 1, 2019

(65) Prior Publication Data
US 2021/0044569 A1  Feb. 11, 2021

Related U.S. Application Data

(60) Provisional application No. 62/622,005, filed on Jan. 25, 2018.

(51) Int. Cl.
*H04L 67/02* (2022.01)
*H04L 67/563* (2022.01)
(Continued)

(52) U.S. Cl.
CPC ...... *H04L 63/0281* (2013.01); *H04L 63/0464* (2013.01); *H04L 63/168* (2013.01);
(Continued)

(58) Field of Classification Search
CPC ... H04L 63/0281; H04L 63/168; H04L 67/02; H04L 67/2814; H04L 67/2819
See application file for complete search history.

(56) References Cited

U.S. PATENT DOCUMENTS 8,250,644 B1 *   8/2012  Upadhyay ............... H04L 63/08
                                                      713/168
2016/0192175 A1 * 6/2016  Van Veen ............ H04L 12/1407
                                                      455/433
(Continued)

FOREIGN PATENT DOCUMENTS

EP          3 188 402 A1    7/2017
WO   WO 2019/145330 A1     8/2019

OTHER PUBLICATIONS

3rd Generation Partnership Project, Technical Specification Group Core Network and Terminals; Study on CT WG3 Aspects of 5G System—Phase 1; Stage 3, Release 15, TR 29.890-200, pp. 1-158 (Year: 2017).*

(Continued)

*Primary Examiner* — Minh Chau Nguyen
(74) *Attorney, Agent, or Firm* — Hamilton, Brook, Smith & Reynolds, P.C.

(57) ABSTRACT

The present disclosure may be implemented in the form of a method or corresponding apparatus for sending signaling messages through an IPX proxy from a first network element. The at least one example embodiment includes a first network element located on a first mobile network, the first network element configured to establish an initial signaling connection with a second network element on a second mobile network. The first network element may be configured to send a signaling request message to the second network element, receive a signaling response message from the second network element, the received signaling response message including an indication of an IPX proxy selected by (Continued)

the second network element. The first network element may be further configured to establish a signaling connection with the IPX proxy indicated in the received signaling response message, and send a second signaling request message to the IPX proxy for mediation service.

10 Claims, 13 Drawing Sheets

(51) Int. Cl.
*H04L 67/564* (2022.01)
*H04L 9/40* (2022.01)
*H04W 12/037* (2021.01)
*H04W 84/04* (2009.01)
*H04W 92/02* (2009.01)

(52) U.S. Cl.
CPC ............ *H04L 67/02* (2013.01); *H04L 67/563* (2022.05); *H04L 67/564* (2022.05); *H04W 12/037* (2021.01); *H04W 84/042* (2013.01); *H04W 92/02* (2013.01)

(56) References Cited

U.S. PATENT DOCUMENTS

| | | | | |
|---|---|---|---|---|
| 2018/0247222 | A1* | 8/2018 | Tolomei | G06Q 30/0242 |
| 2019/0207963 | A1* | 7/2019 | Lord | H04L 63/1425 |
| 2019/0230182 | A1* | 7/2019 | Martin | G06F 16/2433 |

OTHER PUBLICATIONS

GSM Association Official Document, GSMA PRD IR.65 IMS Roaming & Interworking Guidelines, Version 22.0, 57 pages, dated Oct. 11, 2016.
International Search Report and Written Opinion for Int'l Application No. PCT/EP2019/051571, titled: IPX Signaling Security, dated Apr. 18, 2019.
3GPP TS 23.401 v15.2.0, 3rd Generation Partnership Project, Technical Specification Group Services and System Aspects; General Packet Radio Service (GPRS) enhancements for Evolved Universal Terrestrial Radio Access Network (E-UTRAN) access Release 15, pp. 1-404, Dec. 22, 2017.
3GPP TS 23.501 v15.0.0, 3rd Generation Partnership Project, Technical Specification Group Services and System Aspects; System Architecture for the 5G System; Stage 2, Release 15, pp. 1-181, Dec. 22, 2017.
3GPP TS 23.502 v15.0.0, 3rd Generation Partnership Project, Technical Specification Group Services and System Aspects; Procedures for the 5G System; Stage 2, Release 15, pp. 1-258, Dec. 22, 2017.
3GPP TS 23.503 v15.0.0, 3rd Generation Partnership Project, Technical Specification Group Services and System Aspects; Policy and Charging Control Framework for the 5G System; Stage 2, Release 15, pp. 1-56, Dec. 22, 2017.
3GPP TS 29.500 v0.3.0, 3rd Generation Partnership Project, Technical Specification Group Core Network and Terminals; 5G System; Technical Realization of Service Based Architecture; Stage 3, Release 15, pp. 1-11, Dec. 22, 2017.
3GPP TR 29.890 v2.0.0, 3rd Generation Partnership Project, Technical Specification Group Core Network and Terminals; Study on CT WG3 Aspects of 5G System, Phase 1, Stage 3, Release 15, pp. 1-158, Dec. 22, 2017.
3GPP TS 33.501 v0.6.0, 3rd Generation Partnership Project, Technical Specification Group Services and System Aspects; Security Architecture and Procedures for 5G System, Release 15, pp. 1-79, Dec. 22, 2017.
3GPP TSG SA WG3 (Security) Meeting #90, Inter Operator Signaling Security in 5G Proposal, Gothenburg, Sweden, 1-5 pages, Jan. 22-26, 2018.
Belshe, M., et al., "Hypertext Transfer Protocol Version 2 (HTTP/2)" Internet Engineering Task Force (IETF), Request for Comments: 7540, Category: Standards Track, ISSN: 2070-1721, (May 2015).
Fajardo, V., et al., "Diameter Base Protocol" Internet Engineering Task Force (IETF), Request for Comments: 6733, Obsoletes: 3588, 5719, Category: Standards Track, ISSN: 2070-1721, (Oct. 2012).

* cited by examiner

IPX SIGNALING SECURITY

This application is the U.S. National Stage of International Application No. PCT/EP2019/051571, filed Jan. 23, 2019, which designates the U.S., published in English, and claims the benefit of U.S. Provisional Application No. 62/622,005, filed Jan. 25, 2018. The entire teachings of the above applications are incorporated herein by reference.

BACKGROUND

The use of mobile telephony is embedded into society as a whole. The system that was primarily deployed in well developed countries has now become a global affair. Roaming is one of the pillars of the modern mobile telephony system, and due to standardization efforts, roaming is possible on a global scale.

In mobile communications networks, signaling messages are vital for the functioning of the network. Signaling messages make sure that subscribers have mobility management in order to receive Short Message Service (SMS) texts and calls, set up Internet (data) sessions, get billed properly, etcetera.

There are several different signaling protocols used by mobile networks. The dominant protocol that served mobile networks for decades was Signaling System No. 7 or simply "SS7" or "C7." However, the fourth generation of wireless mobile telecommunications technology (4G), also called the Long Term Evolution (LTE) standard does not utilize SS7 and instead utilizes IP based Diameter signaling protocol. The Diameter protocol has advantages in its usability with respect to SS7, for instance on message size and flexibility of creating proprietary fields. Unlike SS7, the Diameter protocol is a hop-by-hop protocol where intermediate nodes in the routing are stateful.

SUMMARY

To provide LTE service for mobile subscribers roaming on a visited LTE network, signaling exchange between the visited LTE network and the home LTE network is normally done via the IP eXchange (IPX) network. The IPX network is an IP network interconnecting IPX providers, where each LTE mobile network has agreements with one or more IPX providers. Diameter signaling is exchanged between the IPX providers using the S6a interface. See Fajardo, V., Ed., Arkko, J., Loughney, J., and G. Zorn, Ed., "Diameter Base Protocol", RFC 6733, DOI 10.17487/RFC6733, October 2012, https://www.rfc-editonorg/info/rfc6733; see also 3GPP TS 23.401; both herein incorporated by reference.

The S6a interface is designed as peer-to-peer (i.e., hop-by-hop) architecture, and every host which implements the Diameter Protocol can act as either a client or a server. Normally each Diameter node is referred to as Diameter Agent. Therefore, between a visited mobile communications network (VPLMN) and home mobile communications network (HPLMN) there could be many Diameter Agents to form an end-to-end signaling path. Each Diameter Agent has its own operational freedom to modify the received payload, route to another node, and so on. IPX providers are able to use this freedom to modify the received payload to perform additional services beyond merely transmitting the signaling messages (e.g., apply service logic and perform mediation services).

However, the recently ratified 5$^{th}$ generation of wireless mobile telecommunications technology (5G) has a service based roaming architecture where one service element can access other services via query over common signaling protocol, which is based on Hypertext Transfer Protocol Version 2 (HTTP/2). HTTP/2 (originally named HTTP/2.0) is a major revision of the HTTP (Hypertext Transfer Protocol) network protocol used by the World Wide Web. However, this signaling protocol implementation has a negative impact to the existing IPX provider service model where transport and signaling mediation services are commonly executed by IPX providers (via IPX Diameter Routing Agents) to the benefit of VPLMNs or HPLMNs. Thus, with the new 5G signaling client/server model (see e.g., FIG. 2B), the IPX provider/proxy role is difficult to play as the 5G signaling protocol (i.e., HTTP/2) can easily bypass IPX providers and their mediation services, and instead directly establish a connection between a VPLMN and a HPLMN.

If the IPX providers are bypassed, the IPX providers are unable to, for example, inspect, modify, add or drop signaling messages. Therefore, the 5G signaling procedure requires changes to ensure mutual-authentication, signaling integrity and confidentiality that is trusted by both the Security Edge Protection Proxy (SEPP) at the VPLMN (i.e., vSEPP) and the SEPP at the HPLMN (i.e., hSEPP) while at the same time allowing IPX providers to execute a mediation/proxy role that is critical for resolving incompatibilities among various protocol implementations and expediting roaming deployments.

Embodiments of the present disclosure provide a solution that guarantees authenticity and integrity on the signaling exchange between mobile roaming networks while enabling IPX providers in between two mobile roaming networks to execute mediation and other services. In other words, embodiments of the present disclosure allow an IPX provider to still play a signaling proxy role with the HTTPS end-to-end security model from the recently ratified 5G architecture.

According to at least one example embodiment, the present disclosure may be implemented in the form of a method or corresponding apparatus for sending signaling messages (e.g., HTTPS, HTTP/2) through an IPX provider acting as an IP transport network from a first network element (e.g., vSEPP, hSEPP). The at least one example embodiment includes a first network element located on a first mobile network (e.g., a home mobile network or a visited mobile network), the first network element configured to establish an initial signaling connection with a second network element (e.g., vSEPP, hSEPP) on a second mobile network (e.g., a home mobile network or a visited mobile network). According to some embodiments, the initial signaling connection may be established using the standard HTTP/2 procedure with TLS (or Application Layer Security (ALS)) with mutual-authentication via the PKI. In other embodiments, alternative types of secure connections and authentication methods may be used to establish the signaling connection between the first network element and the second network element.

According to the at least one example embodiment, the first network element may be configured to send a signaling request message (e.g., HTTPS request, HTTP/2 request) to the second network element on the second mobile network through the initial signaling connection, receive a signaling response message (e.g., HTTPS response, HTTP/2 response) from the second network element, the received signaling response message including an indication of an IPX proxy selected by the second network element. The first network element may be further configured to establish a signaling connection with the IPX proxy indicated in the received signaling response message, and send a second signaling request message to the IPX proxy for mediation service (e.g., inspect a signaling message, modify a signaling message, answer on behalf of a network element or mobile network, drop or block a signaling message, redirect, etc.).

According to some embodiments, the network element may be further configured to receive a signaling response message from the IPX proxy.

According to at least one other example embodiment, a first network element located on a first mobile network (e.g., a home mobile network or a visited mobile network) may be configured to establish an initial signaling connection with a second network element on a second mobile network, send a signaling request message to the second network element on the second mobile network through the initial signaling connection, the signaling request message including a request to redirect to an IPX proxy.

According to the at least one other example embodiment, the network element may be configured to receive a signaling protocol response from the second network element, the received signaling protocol response granting the request to redirect to the IPX proxy, establish a signaling connection with the IPX proxy, and send a second signaling protocol request to the IPX proxy for mediation service.

According to some embodiments, the network element may be further configured to receive a signaling response message from the IPX proxy.

According to at least one other example embodiment, the present disclosure may be implemented in the form of a method or corresponding apparatus for sending signaling messages through an IPX proxy including an IPX proxy located on an IPX network configured to establish a signaling connection with a first network element on a first mobile network, receive a signaling request message from the first network element on the first mobile network through the signaling connection, modify the signaling request message by applying mediation service logic to a payload of the received signaling request message, and send the modified signaling request message to a second network element on a second mobile network.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Figure 1:
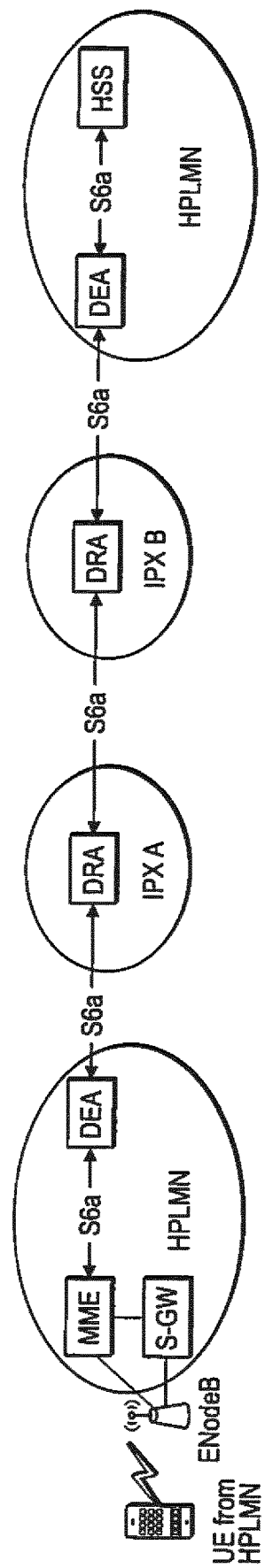
FIG. 1 shows the 4G/LTE roaming architecture including IPX providers.

FIG. 1 shows a 4G/LTE roaming architecture including IPX providers. See GSMA PRD IR.65 IMS Roaming & Interworking Guidelines, Version 22.0 dated Oct. 11, 2016 (herein incorporated by reference). Each IPX provider can operate a Diameter Agent (e.g., DRA—Diameter Routing Agent), and is able to peer with other DRAs in the IPX network. Further, each IPX provider DRA is able to offer mediation service (e.g., modify/Delete Diameter Attribute-Value Pairs (AVP)) and implement routing decisions at the IPX provider's discretion against received protocol payload from both directions without notifying to either the HPLMN or the VPLMN Diameter Edge Agent (DEA).

At least one benefit of the hop-by-hop or peer-to-peer nature of the S6a interface, as shown in FIG. 1, is that the mediation service available from an IPX provider DRA may assist the VPLMN and the HPLMN to quickly resolve incompatibilities due to a variety of reasons in protocol implementation at each signaling node, such as Mobility Management Entity (MME) or Home Subscriber Server (HSS). Another benefit is that the operation of the DEA is simple, because the DEA is able to connect to one IPX provider DRA and depend on the IPX provider DRA to direct the signaling messages to reach another PLMN's DEA.

However, because Diameter protocol is a peer-to-peer based protocol, security is also peer-to-peer, which raises concerns from involved PLMNs. For example, if one of the IPX provider's DRAs were compromised or one of the IPX provider DRAs did not fully follow GSMA recommendations, the whole signaling path would be compromised. Further, there is a lack of authentication between nodes (i.e., Diameter Agents).

Figure 2A:
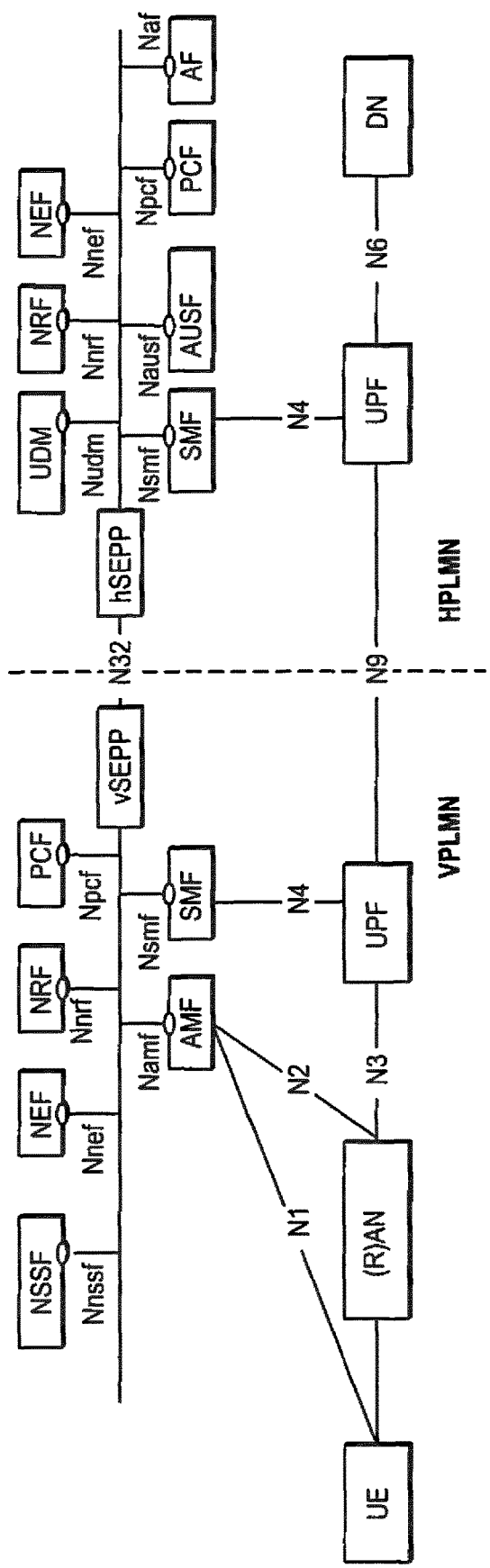
FIG. 2A shows an example of the proposed 5G roaming architecture.

FIG. 2A shows the recently ratified $5^{th}$ generation mobile networks (5G) roaming architecture. See 3GPP TS 23.501 dated Dec. 22, 2017, 3GPP TS 23.502 dated Dec. 22, 2017 and 3GPP TS 23.503 dated Dec. 22, 2017 (herein incorporated by reference). The recently ratified 5G roaming architecture is a service based architecture where one service element can access other services via query over common signaling protocol, which is based on Hypertext Transfer Protocol Version 2 (HTTP/2). HTTP/2 (originally named HTTP/2.0) is a major revision of the HTTP (Hypertext Transfer Protocol) network protocol used by the World Wide Web. The HTTP/2 specification was published as RFC 7540 (Belshe, M., Peon, R., and M. Thomson, Ed., "Hypertext Transfer Protocol Version 2 (HTTP/2)", RFC 7540, DOI 10.17487/RFC7540, May 2015, https://www.rfc-editonorg/info/rfc7540) herein incorporated by reference.

As shown in FIG. 2A, the recently ratified 5G roaming architecture separates the control plane interface (N32) and the user plane interface (N9), with the signaling interface between the Security Edge Protection Proxy (SEPP) in the VPLMN and the SEPP in the HPLMN being HTTP based (e.g., HTTP/2, HTTPS). The SEPP in the VPLMN and the HPLMN is a non-transparent proxy and supports message filtering and policing on inter-PLMN control plane interfaces, as well as topology hiding. The detailed functionality of SEPP and related flows are specified in 3GPP TS 33.501: "Security architecture and procedures for 5G system" (herein incorporated by reference).

Figure 2B:
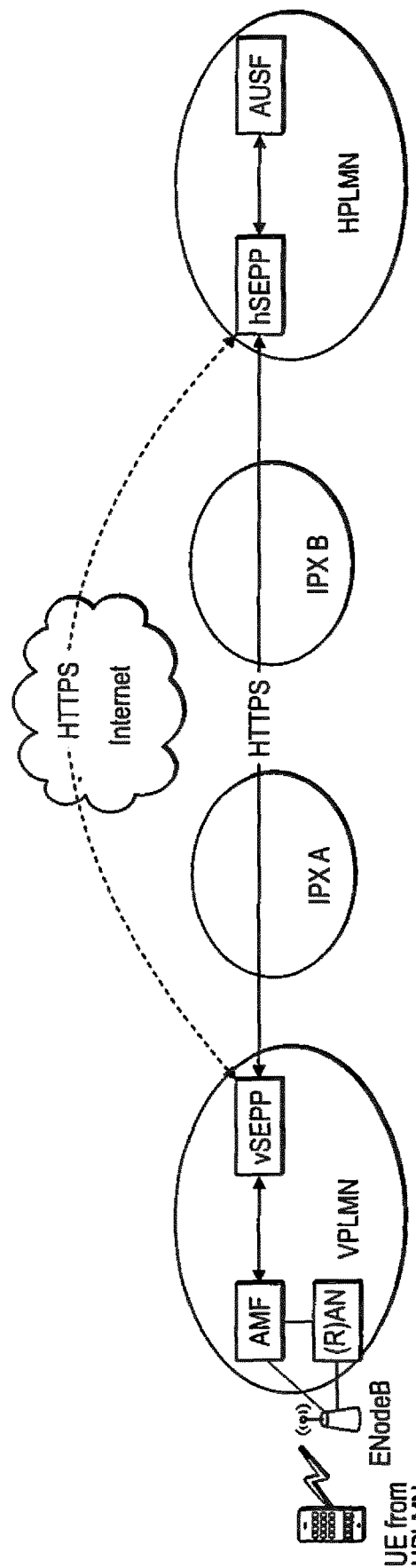
FIG. 2B illustrates an example of HTTP/2 based signaling between the vSEPP and the hSEPP, according to at least one embodiment.

FIG. 2B illustrates the HTTP/2 based signaling between the visited SEPP (vSEPP) and the home SEPP (hSEPP). In some embodiments, the HTTP/2 signaling may utilize Transport Layer Security (TLS) (e.g., TLS 1.2 or above). In such embodiments, mutual-authentication and encryption between vSEPP and hSEPP is common and widely implemented. This is also the case in industries other than telecommunications.

The VPLMN and HPLMN do not require an IPX provider or IPX proxy in between to achieve end-to-end security using HTTP/2 with mutual trust relationship. In fact, any transport, IPX network (solid HTTPS line) or Internet (dashed HTTPS line), can be used to carry TLS protected signaling traffic. However, this implementation has a negative impact on the existing IPX provider service model where transport and signaling mediation services are commonly executed by IPX providers to the benefit of VPLMNs or HPLMNs. Thus, with the new 5G signaling client/server model shown in FIG. 2B, the IPX provider/proxy role is difficult to play as current TLS using Public Key Infrastructure (PM) does not allow IPX providers to perform mediation services by, for example, inspecting, modifying, adding or dropping signaling messages. Therefore, the 5G signaling procedure requires changes to ensure mutual-authentication, signaling integrity and confidentiality that is trusted by both vSEPP and hSEPP while at the same time allowing IPX providers to execute a mediation/proxy role that is critical for resolving incompatibilities among various protocol implementations and expediting roaming deployments.

Figure 3A:
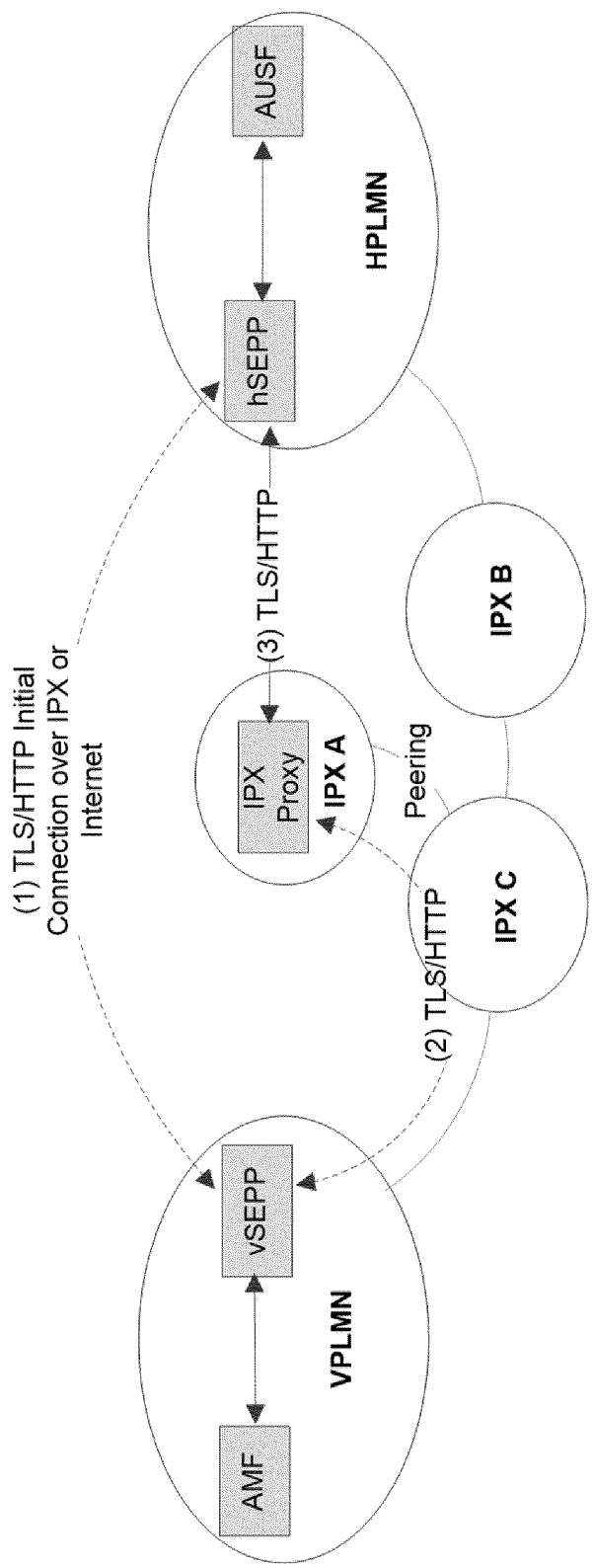
FIG. 3A illustrates an example of HTTP/2 based signaling between the vSEPP and the hSEPP where the hSEPP selects an IPX proxy among multiple IPX providers, according to another embodiment.

FIG. 3A illustrates 5G control plane signaling between a VPLMN and a HPLMN, according to at least one embodiment. As stated above, embodiments of the present disclosure, such as the embodiment of FIG. 3A, allow the IPX provider to play a proxy role while using HTTPS protocol with an end-to-end security. According to the embodiment illustrated in FIG. 3A, a mobile subscriber of the HPLMN is roaming in a VPLMN. First, the VPLMN and HPLMN begin the process necessary to provide 5G data service to the roaming mobile subscriber. In some embodiments, the vSEPP of the VPLMN may establish an initial signaling connection over an IPX network or the Internet (e.g., HTTP/2) with a hSEPP via a standard procedure for TLS with mutual-authentication using PKI. In other embodiments, the hSEPP may establish the initial signaling connection with the vSEPP in the same manner.

In some embodiments, the hSEPP may decide to use an IPX proxy for incoming signaling from the vSEPP and selects an appropriate IPX proxy (belonging to IPX provider A) from among multiple IPX proxies on the IPX exchange network. The IPX exchange network includes many IPX providers with peering connections to each other and PLMNs. FIG. 3A shows three IPX providers (i.e., IPX A, IPX B and IPX C) for illustrative purposes only and does not limit the amount of IPX providers. The selection of IPX provider A's IPX proxy may depend on any number of factors, including which VPLMN the mobile subscriber is roaming in, the type of message being received or sent, the mobile subscriber or the SUPI/IMSI range of the mobile subscriber, or any other factor important to the HPLMN in the section of the appropriate IPX proxy. The VPLMN may employ an IPX proxy selection logic to choose the appropriate IPX proxy.

According to some embodiments, after the hSEPP selects an IPX proxy, the hSEPP sends a signaling response message with an indication of and information regarding the selected IPX proxy to the vSEPP. The vSEPP may then use the information sent with the signaling response message to begin building a signaling connection (e.g., HTTPS, HTTPS/2) with TLS and mutual-authentication with the IPX proxy through the IPX network. For example, FIG. 3A shows the vSEPP connecting with the IPX proxy through the IPX provider C on the IPX network. In this example, the connection would be transparent to IPX provider C and IPX provider C would not have access to the signaling messages, and thus IPX provider C would not be able to perform mediation or other services. One of ordinary skill in the art would recognize that this connecting through IPX provider C is shown as an example, and vSEPP could connect to the IPX proxy with other types of connections over other networks. In some embodiments, the IPX proxy will be certified with the same Root-Cl that certifies both vSEPP and hSEPP for their public/private key pair used in PKI authentication.

Once the vSEPP establishes the signaling connection with the IPX proxy, all the signaling payloads (e.g., HTTPS request) destined for hSEPP will be received at the IPX proxy. In some embodiments, the IPX proxy receives the signaling payload from the vSEPP and applies service logics to perform mediation and other services, and subsequently forwards the modified signaling payload to hSEPP assuming there is a secured connection (e.g., HTTPS, IPSEC protected VPN) between the IPX proxy and the hSEPP. In some embodiments, the IPX proxy may receive a signaling payload (e.g., HTTPS response) from the hSEPP and modify the payload before forwarding the modified signaling payload onto the vSEPP.

Figure 3B:
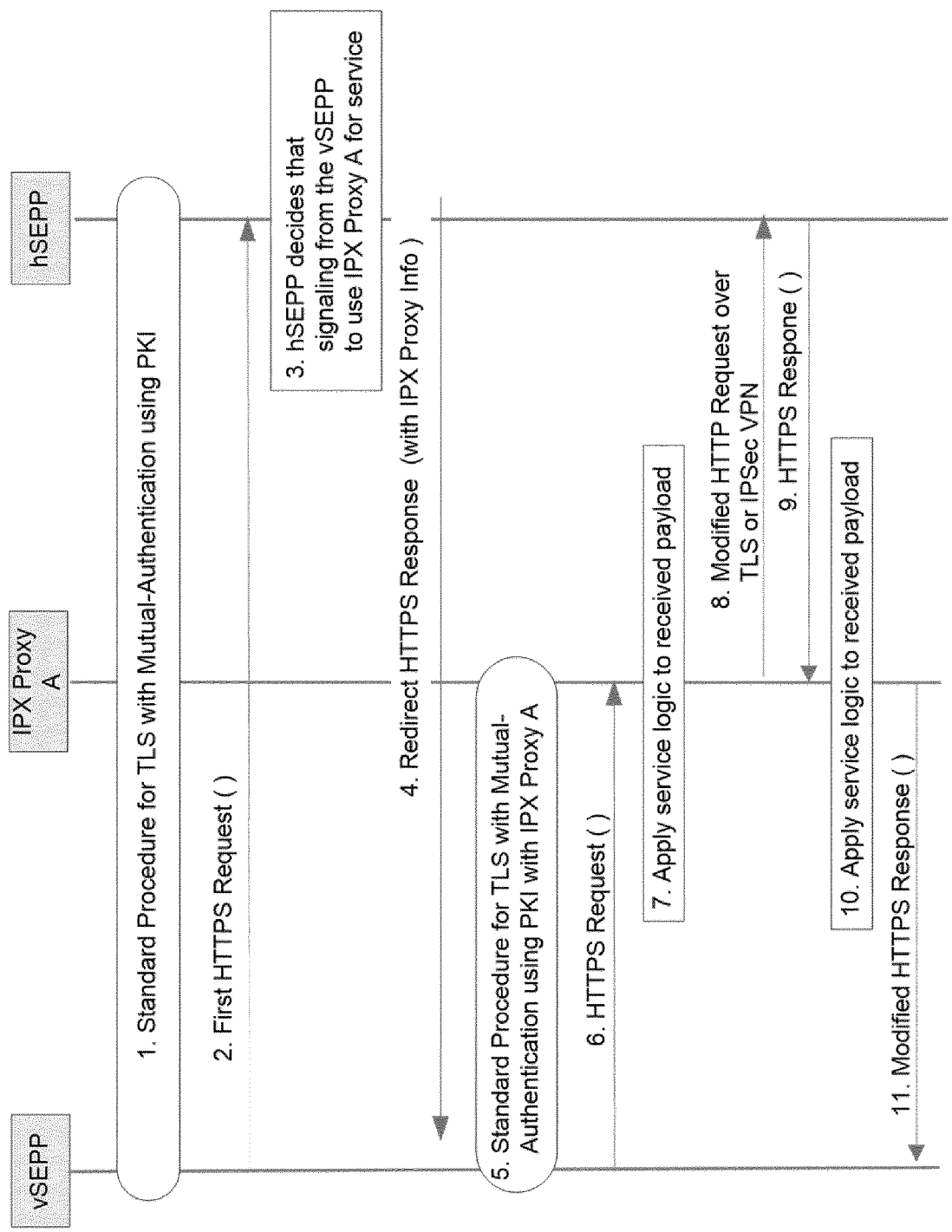
FIG. 3B is an example signaling diagram according to the embodiment illustrated in FIG. 3A.

FIG. 3B shows the signaling diagram according to the at least one embodiment illustrated in FIG. 3A. It should be understood that although FIG. 3B is shown with the vSEPP on the left and the hSEPP on the right, the direction of the messaging could be reversed. This would result in the hSEPP performing all the steps of the vSEPP in FIG. 3B and vice versa. Further, although FIGS. 3A and 3B are shown referencing HTTPS one of ordinary skill in the art would recognize that other signaling protocols may be used. Further still, although FIGS. 3A and 3B are shown referencing TLS or IPSEC protected VPN secured connections, one of ordinary skill in the art would recognize that other types of secured connections between network elements (e.g., Application Layer Security (ALS)) may be used.

Figure 3C:
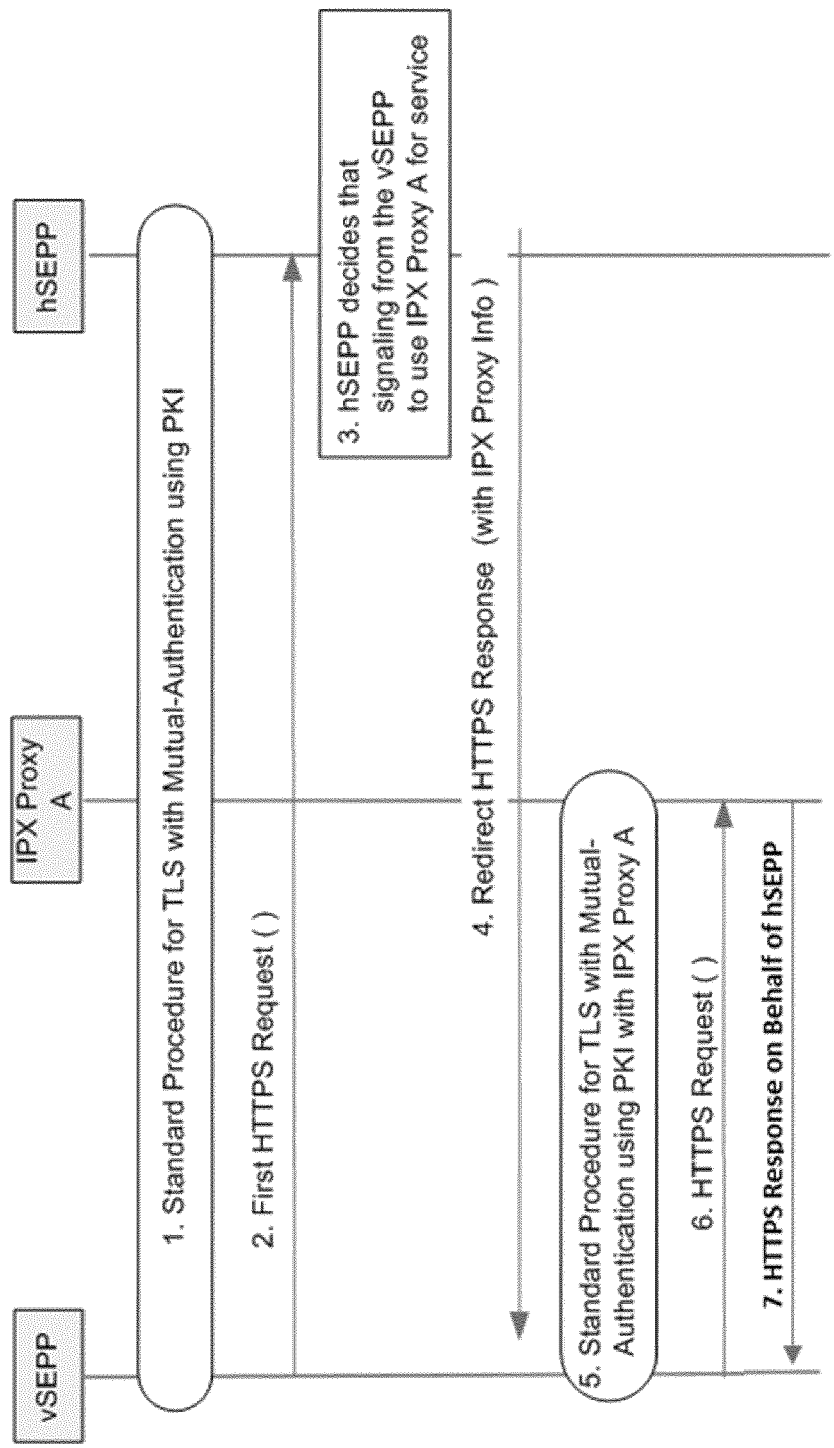
FIG. 3C is an example signaling diagram where the IPX proxy responds to the vSEPP on behalf of the hSEPP.

FIG. 3C shows a signaling diagram according to an embodiment where the IPX proxy responds to the vSEPP on behalf of the hSEPP. For example, IPX proxy may respond on behalf of the hSEPP because the HPLMN has outsourced a service to the IPX provider where the IPX proxy respond to the HTTPS request from the vSEPP without the hSEPP needing to receive the HTTPS request. This may be the case when an IPX provider steers roaming services on behalf of a hSEPP PLMN. As shown in the FIG. 3C, the signaling is similar as described above in reference to FIGS. 3A and 3B, however the IPX proxy responds the vSEPP directly without having to forward the second HTTPS request to the hSEPP.

Figure 4A:
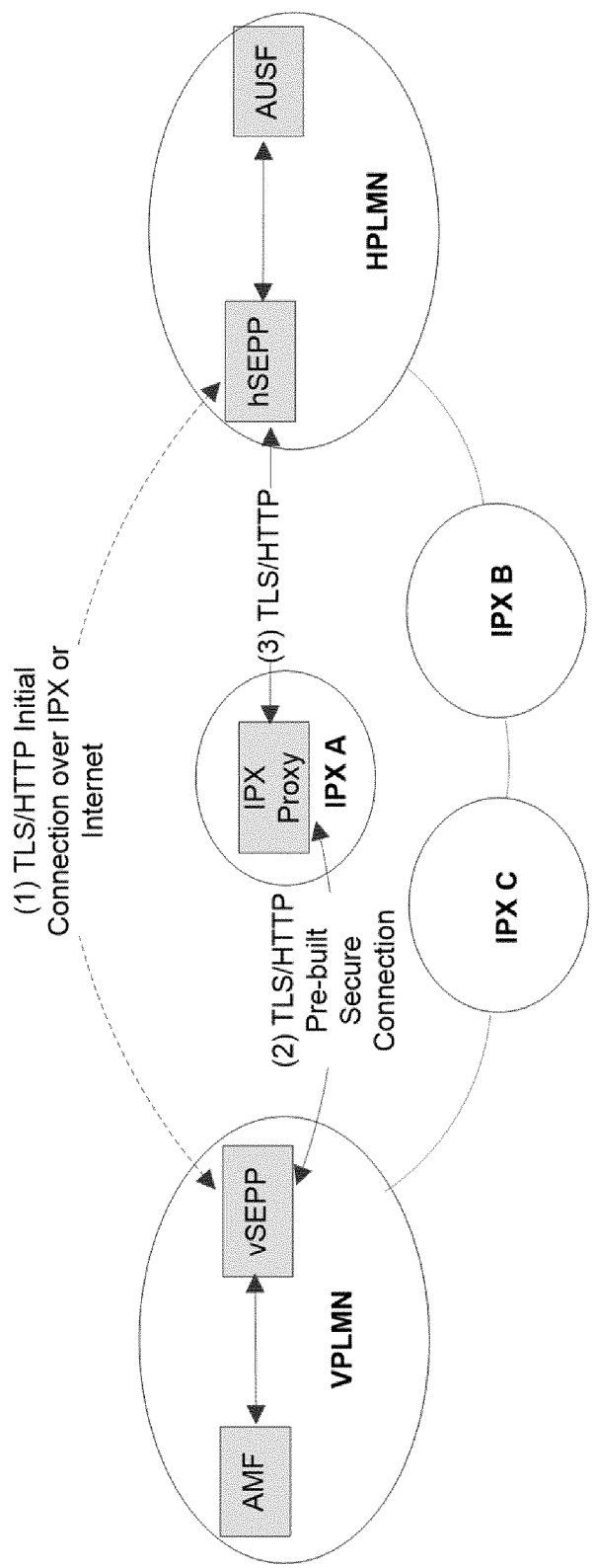
FIG. 4A illustrates example of HTTP/2 based signaling between the vSEPP and the hSEPP where the vSEPP selects an IPX proxy among multiple IPX providers, according to another embodiment.

FIG. 4A is a diagram illustrating 5G control plane signaling between a VPLMN and a HPLMN, according to at least one other embodiment. According to the embodiment illustrated in FIG. 4A, a mobile subscriber of the HPLMN is roaming in a VPLMN. First, the VPLMN and HPLMN begin the process necessary to provide 5G data service to the roaming mobile subscriber. In some embodiments, the vSEPP of the VPLMN may establish an initial signaling connection over an IPX network or the Internet (e.g., HTTP/2) with a hSEPP via a standard procedure for TLS with mutual-authentication using PKI. In other embodiments, the hSEPP may establish the initial signaling connection with the vSEPP in the same manner.

In some embodiments, the vSEPP may decide to use an IPX proxy for signaling being sent to the hSEPP and selects an appropriate IPX proxy (belonging to IPX provider A) from among multiple IPX proxies on the IPX exchange network. As stated above, The IPX exchange network includes many IPX providers with peering connections to each other and PLMNs. FIG. 3A shows three IPX providers (i.e., IPX A, IPX B and IPX C) for illustrative purposes only and does not limit the amount of IPX providers. The selection of the IPX proxy may depend on any number of factors, including which HPLMN the mobile subscriber is associated with, the type of message being received or sent, the mobile subscriber or the SUPI/IMSI range of the mobile subscriber, or any other factor important to the VPLMN in the section of the appropriate IPX proxy. The VPLMN may employ an IPX proxy selection logic to choose the appropriate IPX proxy.

According to some embodiments, after the vSEPP selects the IPX proxy, the vSEPP sends a signaling request message with a request to redirect the signaling through the selected IPX proxy to the hSEPP. In some embodiments, the signaling request message includes an indication of, and information regarding the selected IPX proxy. The hSEPP may then send a signaling response message granting the vSEPP permission to redirect traffic through the selected IPX proxy.

In some embodiments, the vSEPP may disconnect the signaling connection/session with the hSEPP and begin building a signaling connection (e.g., HTTPS, HTTPS/2) with TLS and mutual-authentication with the selected IPX proxy. In some embodiments, the vSEPP may use an existing pre-built VPN connection to the IPX proxy.

According to some embodiments, the vSEPP may send a second signaling request message to the IPX proxy with instructions for the IPX proxy to redirect the second signaling request message to the hSEPP. In response, the IPX proxy may build a secure connection (e.g., TLS with mutual-authentication security, IPSEC VPN) with the hSEPP and forward all the signaling messages from the vSEPP to the hSEPP after mediation and other services are applied to the received signaling message payload.

Once the vSEPP establishes the signaling connection with the IPX proxy, all the signaling payloads (e.g., HTTPS request) destined for hSEPP will be received at the IPX proxy. In some embodiments, the IPX proxy applies mediation and other services and subsequently forwards the modified signaling payload to hSEPP through a secured connection (e.g., HTTPS, IPSEC protected VPN) between the IPX proxy and the hSEPP. In some embodiments, the IPX proxy may receive a signaling payload (e.g., HTTPS response) from the hSEPP and again apply mediation and other services to the payload before forwarding it on to the vSEPP.

Figure 4B:
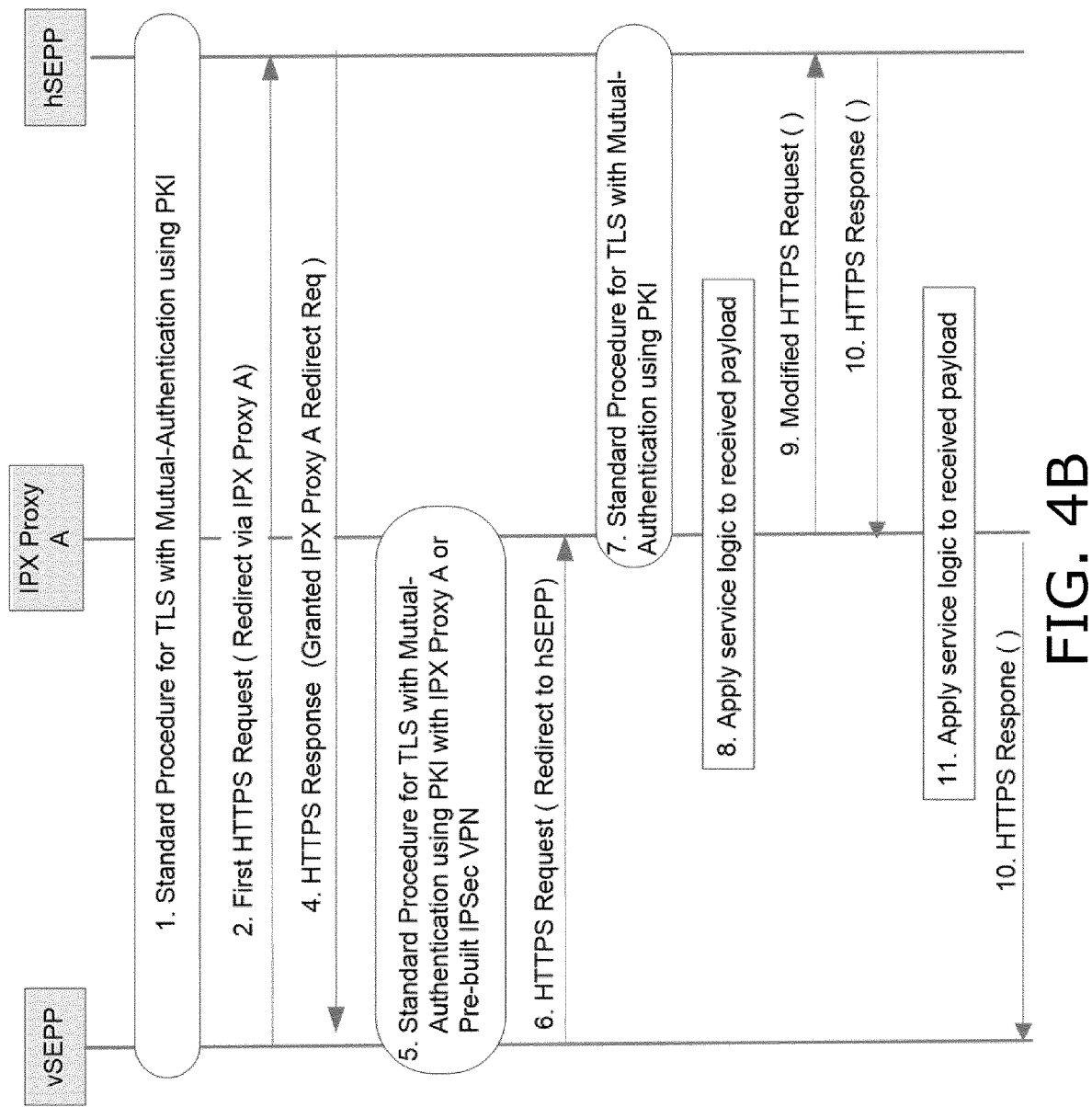
FIG. 4B is an example signaling diagram according to the embodiment illustrated in FIG. 4A.

FIG. 4B shows the signaling diagram according to the embodiment illustrated in FIG. 4A. It should be understood that although FIG. 4B is shown with the vSEPP on the left and the hSEPP on the right, the direction of the messaging could be reversed. This would result in the hSEPP performing all the steps of the vSEPP shown in FIG. 4B and vice versa. Further, although FIGS. 4A and 4B are shown referencing HTTPS, one of ordinary skill in the art would recognize that other signaling protocols may be used. Further still, although FIGS. 4A and 4B are shown referencing TLS or IPSEC protected VPN secured connections, one of ordinary skill in the art would recognize that other types of secured connections between network elements (e.g., ALS) may be used.

Figure 5:
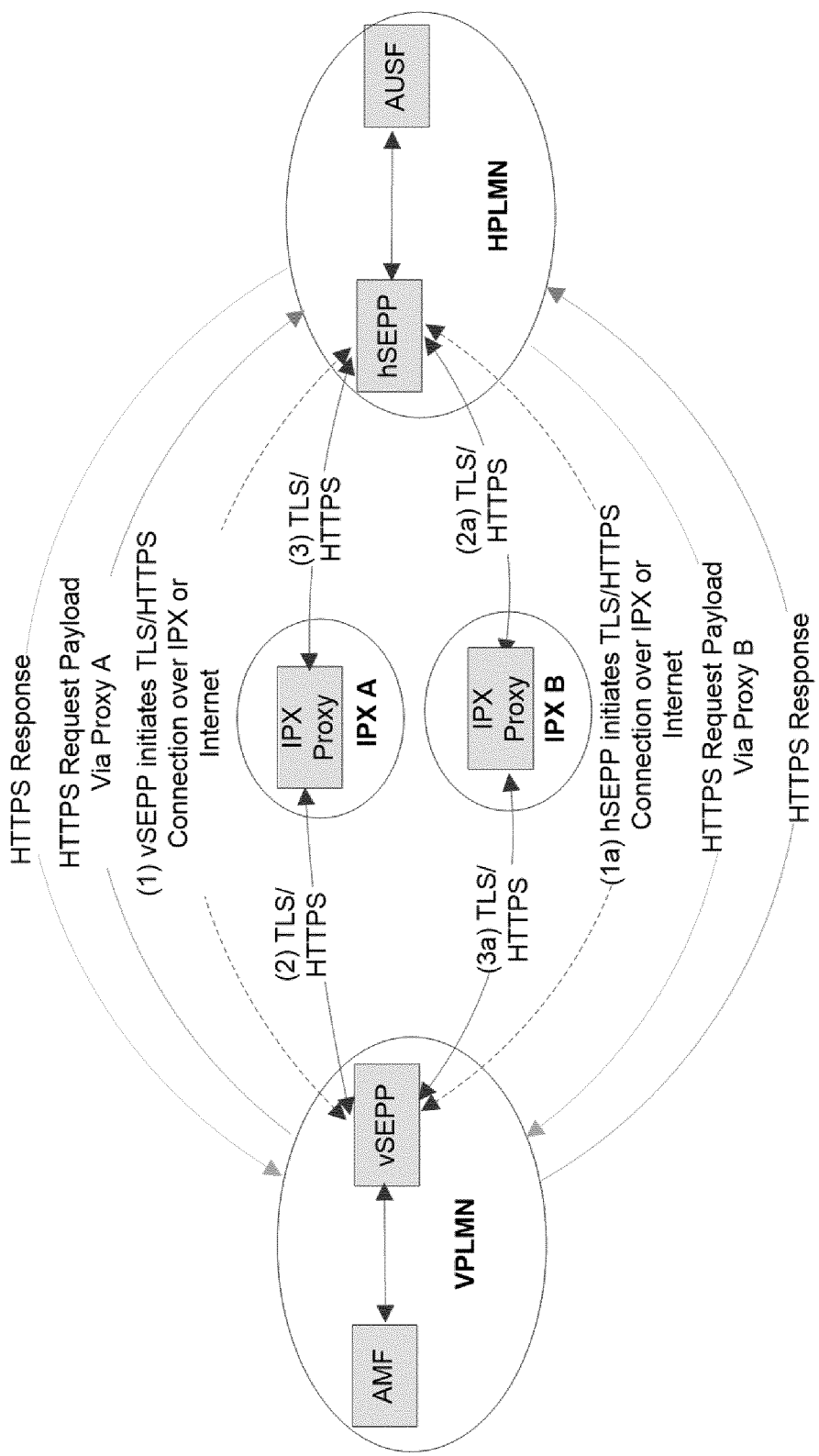
FIG. 5 illustrates an example embodiment where both a VPLMN and a HPLMN initiate their own HTTPS session respectively.

FIG. 5 illustrates an embodiment where the signaling payload may be carried by an HTTPS request, which means both sides (VPLMN and HPLMN) would have to initiate its own HTTPS session respectively. FIG. 5 shows that the vSEPP and the hSEPP can each select its own proxy services independently. For example, the vSEPP may initiate a signaling connection with the hSEPP as described above in reference to FIG. 4A and FIG. 4B. Independently, the hSEPP may also initiate a signaling connection with the vSEPP as described above in reference to FIG. 3A and FIG. 3B except the hSEPP selects IPX provider B's IPX proxy instead of IPX provider A's IPX proxy. This allows the hSEPP and the vSEPP to use their choice of IPX proxy. In some embodiments, the HTTPS requests are the only signaling messages with payloads that are modified by IPX proxies. Because the VPLMN and HPLMN each want to use their choice of IPX proxy (i.e., VPLMN selects IPX A and HPLMN selects IPX B) each communicates HTTPS requests with payloads to each other through their respective proxies. According to some embodiments, this results in the parallel signaling connections as illustrated in FIG. 5 that allow each mobile network to utilize mediation service of the IPX of their choice.

Figure 6A:
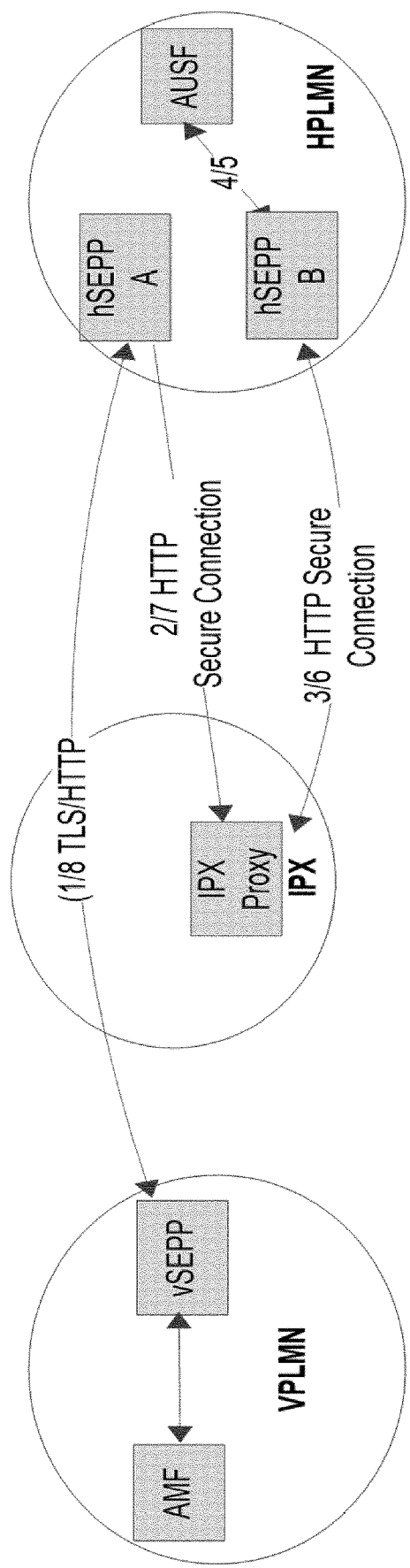
FIG. 6A illustrates an example of HTTP/2 based signaling between the vSEPP and the hSEPP, according to another embodiment.

FIG. 6A is a diagram illustrating 5G signaling between a VPLMN and a HPLMN according to another embodiment. According to the embodiment illustrated in FIG. 6A, a mobile subscriber of the HPLMN is roaming in a VPLMN. First, the VPLMN and HPLMN begin the process necessary to provide 5G data service to the roaming mobile subscriber. In some embodiments, the vSEPP of the VPLMN may establish an initial signaling connection with a hSEPP A via a standard procedure for TLS with mutual-authentication using PKI. In other embodiments, the hSEPP A may establish the initial signaling connection with the vSEPP.

In some embodiments, the vSEPP may send a signaling request message to the hSEPP A. According to some embodiments, the hSEPP A may decide to use an IPX proxy to perform mediation services for signaling messages that are to be forwarded to hSEPP B and selects an appropriate IPX proxy. In some embodiments, the hSEPP B may represent a SEPP at a different location in the HPLMN, a SEPP of a mobile virtual network operator (MVNO), or a different port on the same SEPP as hSEPP A. Further, the selection of the IPX proxy may depend on any number of factors, including which VPLMN the mobile subscriber is roaming on, the type of message being received or sent, the mobile subscriber or the SUPI/IMSI range of the mobile subscriber, or any other factor important to the HPLMN in the section of the appropriate IPX proxy. The hSEPP A may employ an IPX proxy selection logic to choose the appropriate IPX proxy.

According to some embodiments, after the hSEPP A selects an IPX proxy, the hSEPP A forwards the signaling request message to the selected IPX proxy. In some embodiments, the hSEPP may build a signaling connection (e.g., HTTPS, HTTPS/2) with TLS and mutual-authentication with the selected IPX proxy in the IPX network. In some embodiments, the hSEPP may use an existing pre-built VPN connection to the IPX proxy.

According to some embodiments, the hSEPP A may forward the signaling request message to the IPX proxy with instructions for the IPX proxy to redirect the signaling request message to the hSEPP B. In response to receiving the forwarded signaling request message from the hSEPP A with the instructions to redirect the request to the hSEPP B, the IPX proxy may build a secure connection (e.g., TLS with mutual-authentication security, IPSEC VPN) with the hSEPP B and forward all the signaling messages from the hSEPP A to the hSEPP B after mediation work is done to the received signaling message payload.

According to some embodiments, the hSEPP B may receive the forwarded signaling request message from the IPX proxy. In some embodiments, the hSEPP B may then forward the signaling request message to the proper internal network function (NF) and wait for a response. The hSEPP B may send a signaling response message to the IPX proxy for optional mediation service and forwarding to the hSEPP A. In some embodiments, the hSEPP A receives the signaling response message and forwards the signaling response message to the vSEPP through the initial signaling connection. According to some embodiments, the IPX proxy is transparent to the vSEPP.

Figure 6B:
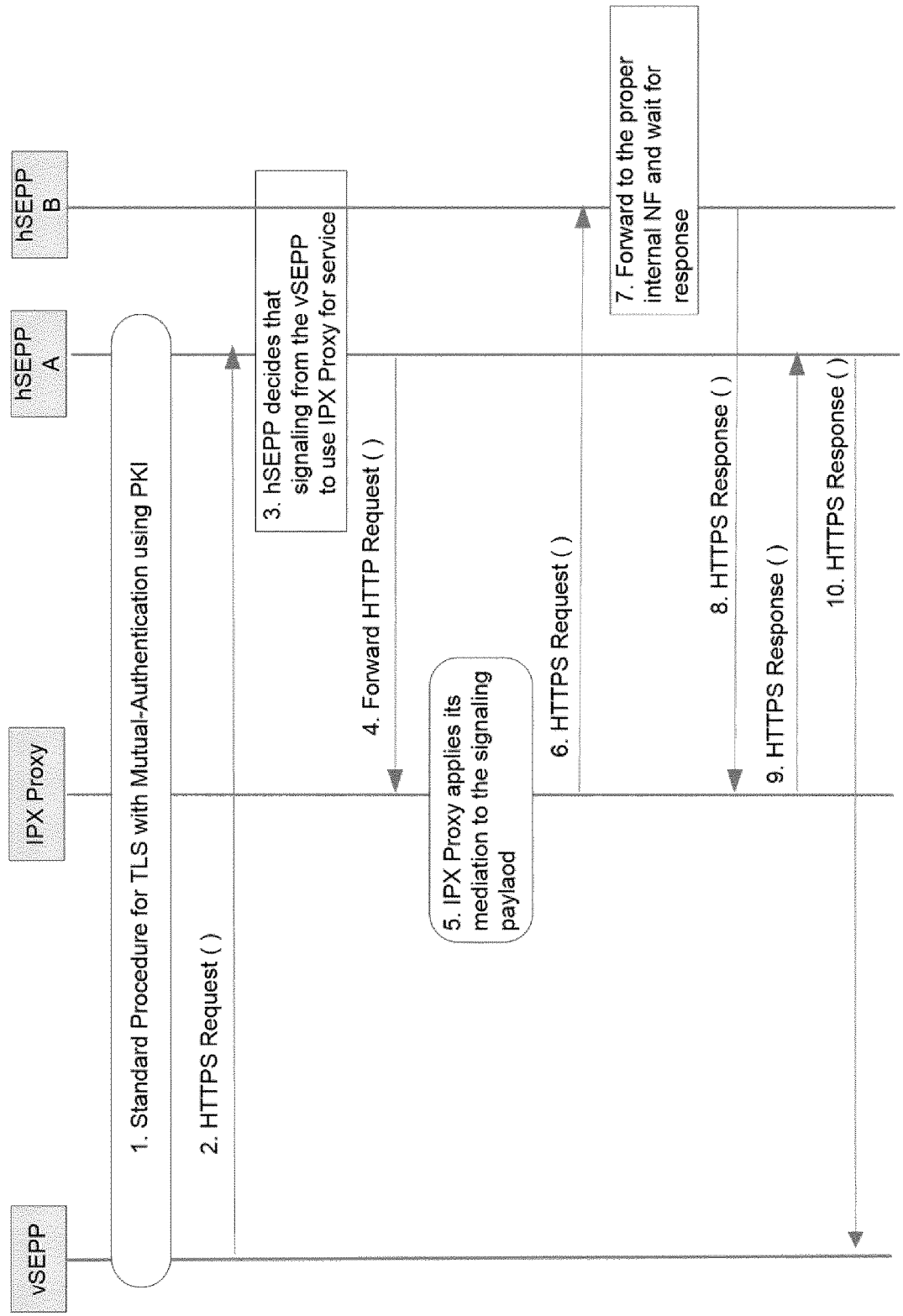
FIG. 6B is an example signaling diagram according to the embodiment illustrated in FIG. 6A.

FIG. 6B shows the signaling diagram according to the embodiment illustrated in FIG. 6A. It should be understood that although FIG. 6B is shown with the vSEPP on the left and the hSEPP on the right, the direction of the messaging could be reversed. This would result in the hSEPP performing all the steps of the vSEPP shown in FIG. 6B and vice versa. In this reverse embodiment, the vSEPP would use the IPX proxy service by sending the mediated payload to hSEPP where the IPX proxy is transparent to the hSEPP.

Further, although FIGS. 6A and 6B are shown referencing HTTPS, one of ordinary skill in the art would recognize that other signaling protocols may be used. Further still, although FIGS. 6A and 6B are shown referencing TLS or IPSEC protected VPN secured connections, one of ordinary skill in the art would recognize that other types of secured connections between network elements (e.g., ALS) may be used.

Figure 7A:
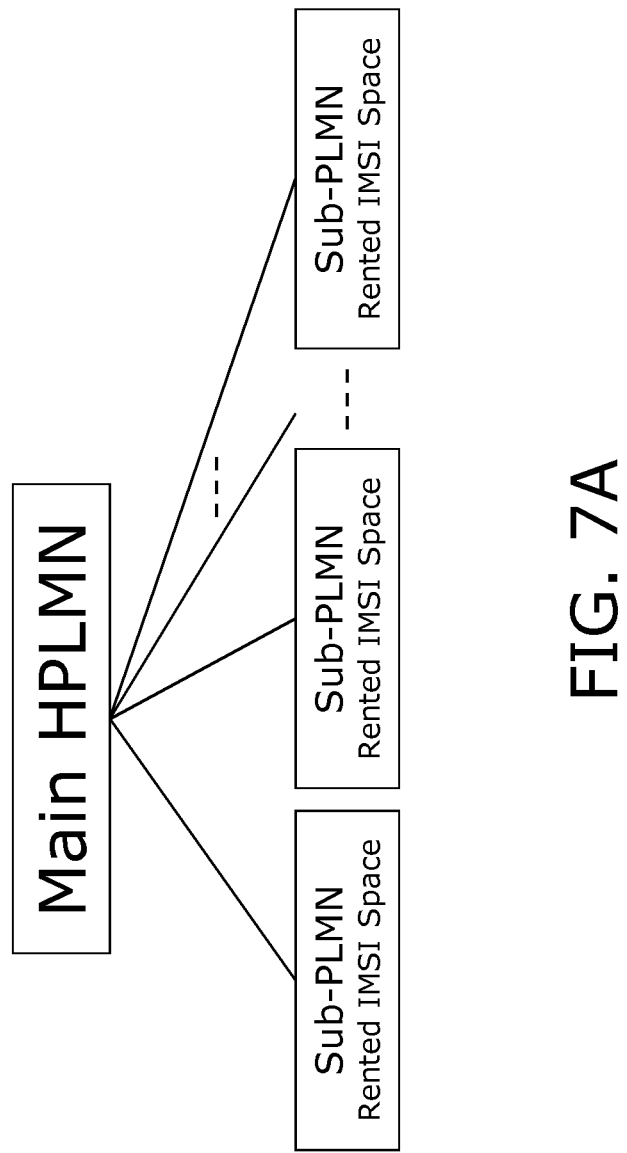
FIG. 7A illustrates an example structure of a HPLMN.

FIG. 7A illustrates an example structure of a HPLMN. According to some embodiments, a HPLMN may have a range of International Mobile Subscriber Identities (IMSIs) that are assigned to HPLMN's mobile subscribers. The IMSIs are used to identify each individual mobile subscription assigned to a mobile subscriber. The structure of an IMSI is (Mobile Country Code)|(Mobile Network Code)|number (i.e., MCC|MNC|number). The equivalent of an IMSI in 5G terminology is a Subscriber Permanent Identifier (SUPI).

According to some embodiments, the HPLMN's range of IMSIs may be subdivided into several different IMSI ranges. In some embodiments, all of the signaling request messages related to the HPLMN mobile subscribers are able to be routed to the hSEPP, because routing of requests is performed based on MCC/MNC which identifies the HPLMN.

For example, some embodiments of FIG. 6A assume that all signaling request messages are forwarded to the IPX proxy, which (based on the IMSI) decides where to route each signaling request message. In another example, IMSIs (without MCC/MNC) starting with 1-5 go back to the HPLMN, but IMSIs starting with 6 belong to a mobile virtual network operator (MVNO) using the HPLMN. In some embodiments, the MVNO may host its core network on a $3^{rd}$ party cloud hosting service. Referring to FIG. 6A and this example, the hSEPP B may be the same entity in case the signaling request message is routed back to HPLMN and will be a different entity in case the request is routed onwards to, for example, the could hosting service.

Figure 7B:
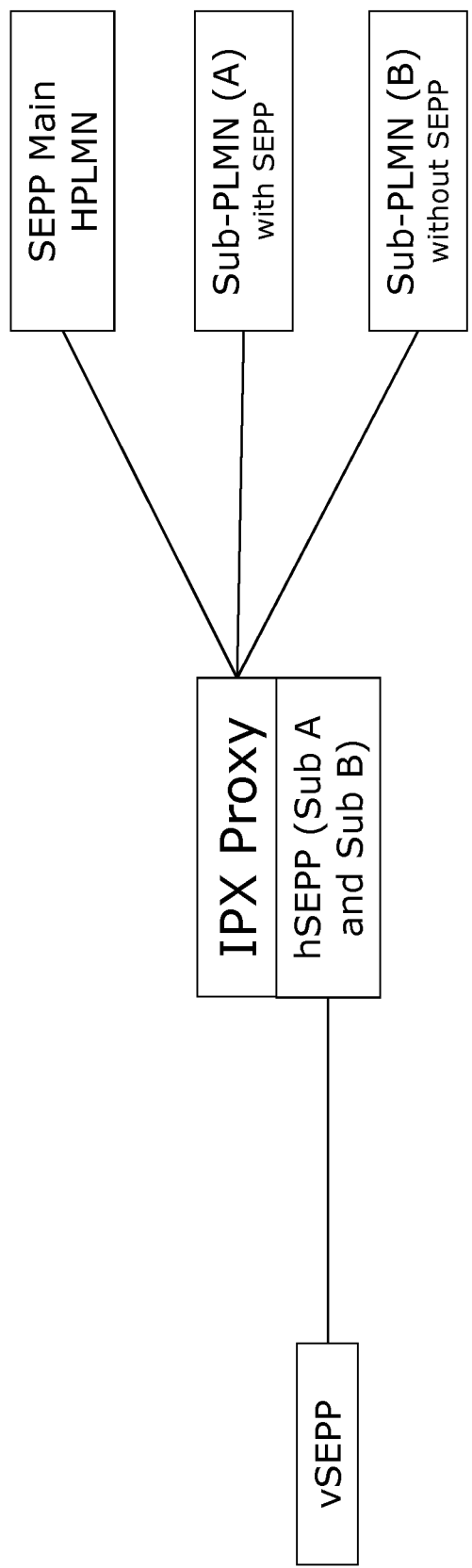
FIG. 7B illustrates an IPX proxy acting as a delegate for the hSEPP.

FIG. 7B illustrates an IPX proxy acting as a delegate for the hSEPP with the ability to respond on behalf of, for example, the SEPP of the Main HPLMN, a Sub-PLMN (A) and a Sub-PLMN (B). According to some embodiments, the Sub-PLMN (A) may have its own SEPP and the Sub-PLMN (B) may not have a SEPP. In either case the IPX proxy may respond on their behalf. For example, the signaling diagram of FIG. 3C illustrates how an IPX proxy may respond on behalf of an HPLMN/SEPP/Sub-PLMN. In some embodiments, the IPX proxy may host the hSEPP (Sub A and Sub B).

One of ordinary skill in the art would understand that MVNOs could also be hosted on the HPLMN core network; in that case there is no difference from the IPX provider's point of view between the HPLMN (hSEPP A) and the MVNO (hSEPP B). Further, as long as the session keys are different, the hSEPP B and hSEPP A could be the same.

Figure 8:
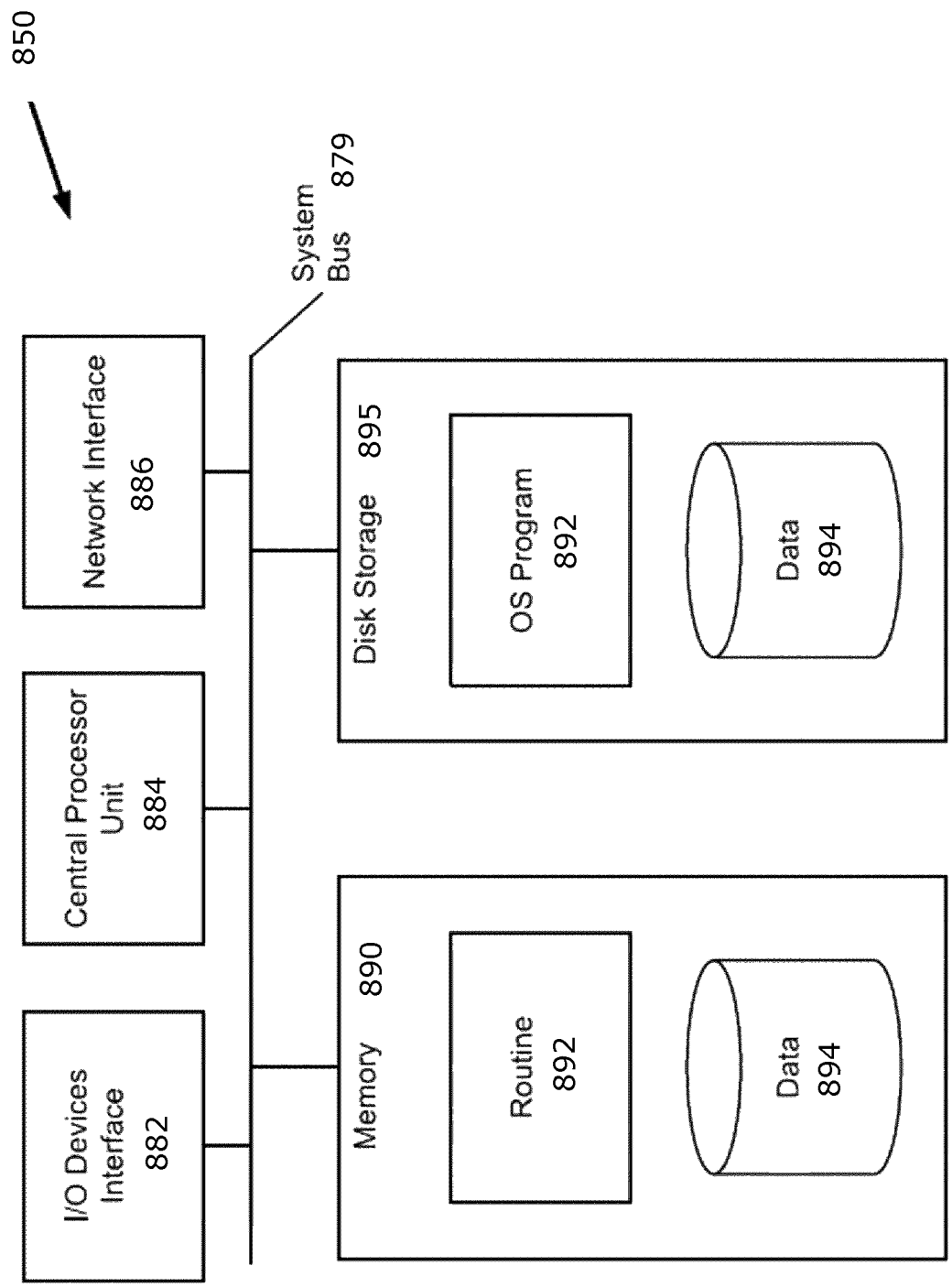
FIG. 8 is a block diagram of the internal structure of a computer in which various embodiments of the present invention may be implemented.

FIG. 8 is a block diagram of the internal structure of a computer 850 in which various embodiments of the present invention may be implemented. The computer 850 contains a system bus 879, where a bus is a set of hardware lines used for data transfer among the components of a computer or processing system. Bus 879 is essentially a shared conduit that connects different elements of a computer system (e.g., processor, disk storage, memory, input/output ports, network ports, etc.) that enables the transfer of information between the elements. Attached to system bus 879 is I/O device interface 882 for connecting various input and output devices (e.g., keyboard, mouse, displays, printers, speakers, etc.) to the computer 850. Network interface 886 allows the computer 850 to connect to various other devices attached to a network. Memory 890 provides volatile storage for computer software instructions 892 and data 894 used to implement an embodiment of the present invention. Disk storage 895 provides non-volatile storage for computer software instructions 892 and data 894 used to implement embodiments of the present disclosure. Central processor unit 884 is also attached to system bus 879 and provides for the execution of computer instructions.

In one embodiment, the processor routines 892 and data 894 are a computer program product (generally referenced 892), including a computer readable medium (e.g., a removable storage medium such as one or more DVD-ROM's, CD-ROM's, diskettes, tapes, etc.) that provides at least a portion of the software instructions for the invention system. Computer program product 892 can be installed by any suitable software installation procedure, as is well known in the art.

In another embodiment, at least a portion of the software instructions may also be downloaded over a cable, communication and/or wireless connection.

Further, the present invention may be implemented in a variety of computer architectures. The computer of FIG. 8 is for purposes of illustration and not limitation of the present invention. In some embodiments of the present disclosure, a network element (i.e., IPX proxy, vSEPP, hSEPP) located on a HPLMN, a transporting mobile network (i.e., IPX network), or a VPLMN may function as a computer to perform aspects of the present disclosure.

It should be understood that the example embodiments described above may be implemented in many different ways. In some instances, the various methods and machines described herein may each be implemented by a physical, virtual or hybrid general purpose computer having a central processor, memory, disk or other mass storage, communication interface(s), input/output (I/O) device(s), and other peripherals. The general purpose computer is transformed into the machines that execute the methods described above, for example, by loading software instructions into a data processor, and then causing execution of the instructions to carry out the functions described, herein.

As is known in the art, such a computer may contain a system bus, where a bus is a set of hardware lines used for data transfer among the components of a computer or processing system. The bus or busses are essentially shared conduit(s) that connect different elements of the computer system, e.g., processor, disk storage, memory, input/output ports, network ports, etc., which enables the transfer of information between the elements. One or more central processor units are attached to the system bus and provide for the execution of computer instructions. Also attached to system bus are typically I/O device interfaces for connecting various input and output devices, e.g., keyboard, mouse, displays, printers, speakers, etc., to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

In certain embodiments, the procedures, devices, and processes described herein constitute a computer program product, including a non-transitory computer-readable medium, e.g., a removable storage medium such as one or more DVD-ROM's, CD-ROM's, diskettes, tapes, etc., that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

Although, the present disclosure refers to 5G mobile networks and HTTP based signaling, one of ordinary skill in the art would recognize that the embodiments of the present disclosure may also apply to other types of networks using other signaling protocols.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A network element for communicating signaling messages through an IPX proxy, the network element located on a first mobile network and configured to:
   send a first request to a second network element on a second mobile network over an established initial signaling connection with the second network element,
   receive a response from the second network element, the received response including an indication of an IPX proxy selected by the second network element,
   establish a signaling connection with the IPX proxy indicated with the received response, and
   send a second request to the IPX proxy to be forwarded to the second network element after the IPX proxy applies service logic to the second request.

2. The network element of claim 1 wherein the network element is further configured to receive a second response from the IPX proxy.

3. The network element of claim 2 wherein the received second response has been modified by the IPX proxy.

4. A network element for communicating signaling messages through an IPX proxy, the network element located on a first mobile network and configured to:
   send a first request to a second network element on a second mobile network over an established initial signaling connection with the second network element, the request including a proposal to redirect signaling through an IPX proxy,
   receive a response from the second network element, the received response granting the proposal to redirect signaling through the IPX proxy,
   establish a signaling connection with the IPX proxy, and
   send a second request message to the IPX proxy to be forwarded to the second network element after the IPX proxy applies service logic to the second request.

5. The network element of claim 4 wherein the network element is further configured to receive a second response from the IPX proxy.

6. The network element of claim 5 wherein the received second response has been modified by the IPX proxy.

7. A system for sending signaling messages through an IPX proxy, the system comprising:
   a first network element located on a first mobile network, the first network element configured to:
      receive a request from a second network element on a second mobile network, the request being received from the second network element through a signaling connection established between the first network element and the second network element, and forward the received request to an IPX proxy for the IPX proxy to apply service logic to a payload of the request;
a third network element configured to:
receive the request from the IPX proxy after the IPX proxy applied service logic to the payload of the request, the request received from the IPX proxy through a signaling connection between the IPX proxy and the third network element, and
send a response to the IPX proxy to be forwarded to the first network element.

8. The system of claim 7 wherein the first network element is further configured to receive the response from the IPX proxy and forward the response to the second network element through the established signaling connection between the first network element and the second network element.

9. The system of claim 8 wherein the network the third network element is located on is the first mobile network or a mobile virtual network.

10. The system of claim 7 wherein the third network element is further configured to forward the request to an internal network function on the network the third network element is located on.

\* \* \* \* \*